(No Model.)  2 Sheets—Sheet 1.

M. D. DRAKE.
VEHICLE PROPELLED BY HAND OR FOOT.

No. 510,332.  Patented Dec. 5, 1893.

Witnesses  
R. M. Kelly  
Frank Pardon

Inventor  
Marshall Duiguid Drake (No Model.) 2 Sheets—Sheet 2.

M. D. DRAKE.
VEHICLE PROPELLED BY HAND OR FOOT.

No. 510,332. Patented Dec. 5, 1893.

Witnesses
R. M. Kerry
Frank Pardon

Inventor
Marshall Dinguid Drake

UNITED STATES PATENT OFFICE.

MARSHALL DIUGUID DRAKE, OF IRVINGTON, KENTUCKY.

VEHICLE PROPELLED BY HAND OR FOOT.

SPECIFICATION forming part of Letters Patent No. 510,332, dated December 5, 1893.

Application filed October 1, 1892. Serial No. 447,507. (No model.)

*To all whom it may concern:*

Be it known that I, MARSHALL DIUGUID DRAKE, a citizen of the United States, residing at Irvington, in the county of Breckinridge and State of Kentucky, have invented certain new and useful Improvements in Tricycles; and I do declare the following to be a full, clear, and exact description of the invention, such as will enable others skilled in the art to which it appertains to make and use the same.

My invention relates to improvements in tricycles, and it has for its object to provide a tricycle of a cheap, simple and light construction, and one adapted to be propelled by the hands or feet of the rider either separately or in concert.

Other objects and advantages of the invention will appear from the following description and claim when taken in connection with the annexed drawings, in which—

Figure 1:
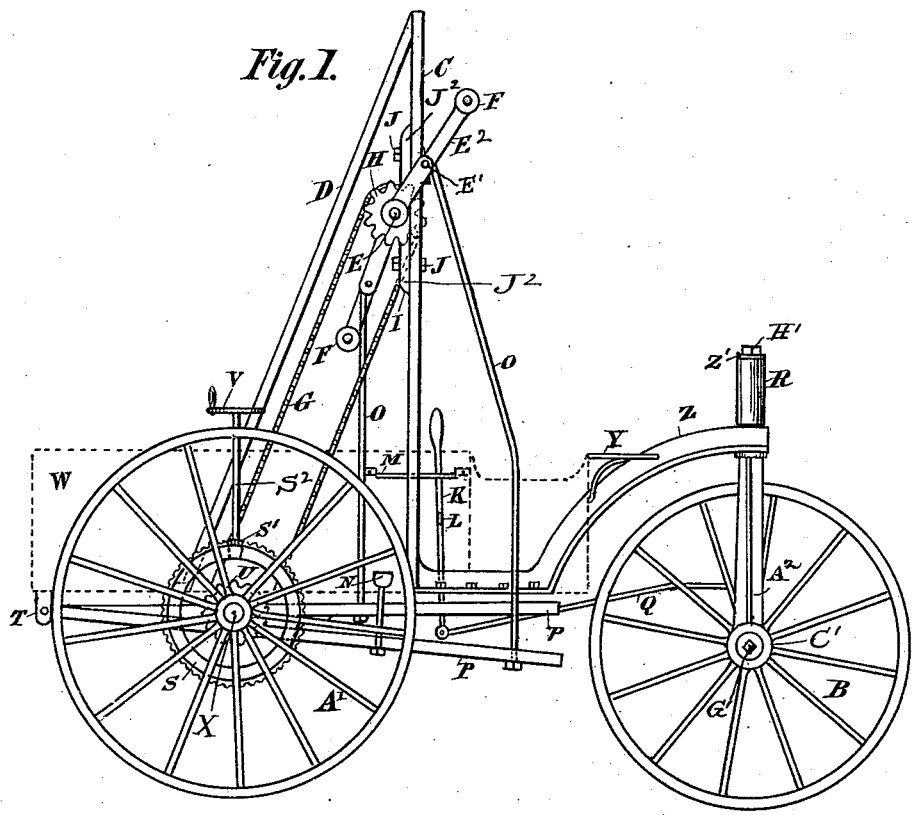
Figure 2:
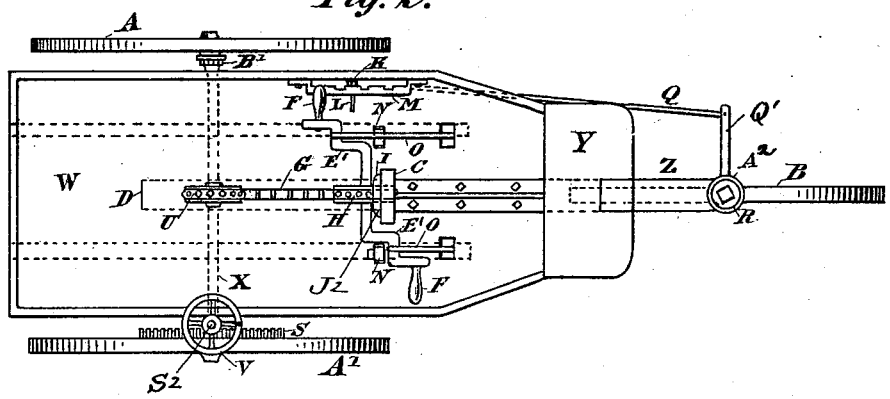
Figure 3:
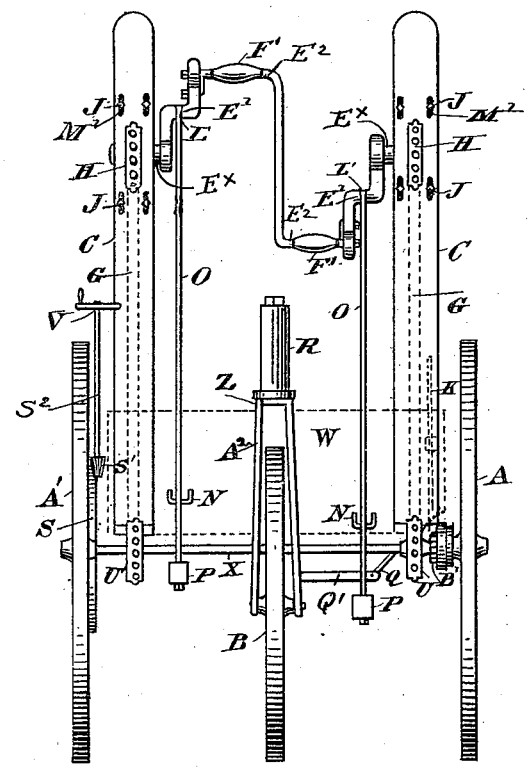
Figure 4:
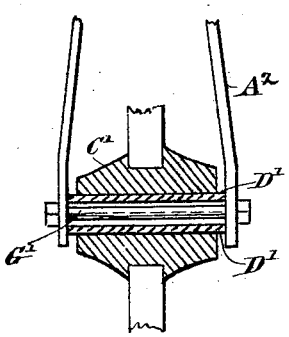

Figure 1, is a side elevation of my improved tricycle. Fig. 2, is a plan view of the same. Fig. 3, is a front elevation of a modified construction, and Figs. 4, 5, 6, and 7, are detail views of parts embodied in both the invention proper and the modification.

Referring by letter to said drawings, and more particularly to Figs. 1, 2, 4, 5, 6, and 7, thereof, W, indicates the main frame or body of the machine which may be of any approved form and construction.

X, indicates the axle which is journaled in suitable bearings at the bottom of the body or frame, and A, A', indicates the main traveling wheels; the wheel A, being loosely mounted upon the axle, while the wheel A', is fixed with respect thereto, for a purpose presently to be described.

B, indicates the pilot wheel of the machine. This wheel is mounted upon a sleeve as D', (see Fig. 4,) and the said sleeve is secured between the branches of a bifurcated turning post A², by a bolt G', which takes through the sleeve and the said branches, as shown. The sleeve D', is of a greater length than the width of the hub C', of the wheel B, as illustrated whereby it will be seen that frictional contact and consequent wear of the hub and branches of the turning post are obviated which is a desideratum.

Figure 5:
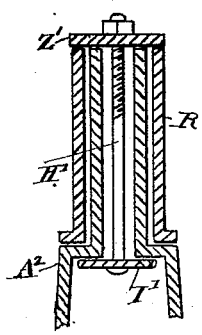
Figures 6, 7:
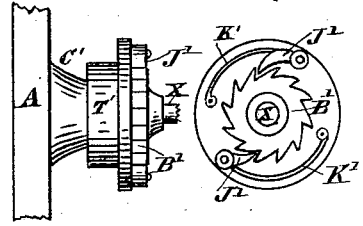

The upper body portion of the turning post A², is tubular and shouldered as better shown in Fig. 5, and its reduced portion is journaled in the sleeve R, at the forward end of the frame Z, and is secured in said sleeve by the vertical bolt H'. This bolt is headed at its lower end, and it takes through a disk or plate I', which bears against the shoulder of the turning post and through a disk or plate Z', which rests against the upper end of said post, whereby it will be seen that it will not in any way interfere with the free turning of the same.

The frame Z, is connected to the main frame or body W, as better shown in Fig. 1, and it serves in conjunction with the bar D, to brace the standard C, which is secured to the main frame and rises from the longitudinal center of the same as shown. This standard C, is provided adjacent to its upper end with longitudinal slots as M', for the passage of bolts J, which serve to adjustably connect the bearing block J², of the crank shaft E, to the standard C.

As better shown in Fig. 2, of the drawings, the shaft E, which carries the fixed sprocket wheel H, at its middle, comprises the short crank branches E', for a purpose presently described, and the comparatively long branches E², to which the handles F, are connected; and motion is transmitted from said shaft E, to the axle through the medium of the sprocket wheel H, the chain G, and the sprocket wheel U, fixed on the axle, as shown.

By reason of the bearing block J², of the crank shaft, being adjustably connected to the standard C, it will be perceived that said shaft may be fixed at various elevations so as to suit it to persons of different sizes. When the crank shaft is raised or lowered, the chain G, may be lengthened or shortened in any approved manner, or a new chain may be substituted therefor, as is most desirable.

P, indicates pedal levers which are pivotally connected at their rear ends to lugs T, depending from the main frame or body and are designed to assist in the propulsion of the machine. These levers P, are provided, as better shown in Fig. 1, with stirrups or foot-rests N, and they are connected to the short cranks E', of the shaft E, by pitmen as O. Thus it will be seen that the rider may use either his hands or his feet, or both, in the propulsion of the machine, and is enabled to drive the same at a high rate of speed.

In order to enable the rider to more easily start the machine, I have provided the beveled gear S, which is fixedly mounted upon the axle X, adjacent to the wheel A', as shown. This beveled gear S, is designed to be engaged by a beveled pinion S', which is fixed upon a vertical shaft $S^2$, and this shaft is provided at its upper end with a hand wheel V, which rests within convenient reach of the rider and is designed to enable him to readily exert a leverage upon and rotate the axle.

K, indicates the steering lever which is designed to be adjustably fixed by the rack M; and Q, indicates the pitman through the medium of which the said lever is connected to the crank arm Q', of the turning post $A^2$.

The lever K is placed within convenient reach of the rider and through the medium of the said lever and the rack M, the rider is enabled to fix the pilot wheel so as to travel in a straight or circular course, without the necessity of keeping his hand upon the lever.

In order to enable the rider to more quickly and easily turn the machine, I have provided the mechanism (better shown in Figs. 6, and 7), which comprises the ratchet wheel B', which is fixed upon the axle X, the disk T', which is fixed with respect to the wheel A, the pawls J', carried by the disk T', and the springs K', backing said pawls. By reason of this mechanism it will be seen that the wheel A, will turn with the axle while traveling in a straight course but will be loose thereon when the machine is making a sharp turn so as to enable the same to swing as on a pivot.

Y, indicates a seat, which is mounted upon the frame Z, and is designed more especially for a child.

In Fig. 3, of the drawings, I have illustrated a modified construction designed for a heavy machine. In this modification, I employ two standards C, and transmit motion from the crank shaft $E^x$, to the axle X, through the medium of two sprockets H, chain belts G, and sprockets U, instead of one as in Figs. 1, and 2. I also provide the said crank shaft $E^x$, with handles F', at intermediate points of its length and journal the ends of said shaft in the bearing blocks $J^2$.

From the foregoing description taken in connection with the drawings, it will be seen that I have provided a tricycle of a cheap, simple, and advantageous construction and one which may be driven at a high rate of speed; and it will also be seen that my improved machine is capable of carrying light parcels and merchandise, and may, if desired be conveniently employed as a delivery vehicle.

In the practice of my invention I prefer to employ the gearing herein illustrated and described for transmitting motion from the crank shaft to the axle, but I do not desire to be understood as confining myself to such gearing as in some cases a train of gear wheels may be employed for the purpose.

Having described my invention, what I claim is—

In a tricycle, the combination with a main frame or body and the curved frame Z, extending forwardly from the main frame and carrying the vertically disposed sleeve R, at its forward end; of the tubular and bifurcated turning post $A^2$, having its upper portion reduced and journaled in the sleeve of the frame Z, the disk Z', arranged above the sleeve R, and the turning post, the disk I', arranged at the lower end of the reduced portion of the turning post, and the vertical bolt H', taking through the disks I', and Z', and serving to connect the turning post and the sleeve R, all as and for the purpose set forth.

MARSHALL DIUGUID DRAKE.

Witnesses:
FRANK PARDON,
F. H. NINEKIRK.